US005788248A

United States Patent [19]
Gibson

[11] Patent Number: 5,788,248
[45] Date of Patent: Aug. 4, 1998

[54] COLLET CHUCK DEVICE

[75] Inventor: Stephen E. Gibson, Salem, S.C.

[73] Assignee: Power Tool Holders Incorprated, Wilmington, Del.

[21] Appl. No.: 735,656

[22] Filed: Oct. 24, 1996

[51] Int. Cl.[6] ............................................. B23B 31/20
[52] U.S. Cl. .................. 279/51; 279/54; 279/59; 279/42; 279/140; 279/56
[58] Field of Search .................. 279/47–49, 51–54, 279/56, 59, 140, 42, 64, 58, 69, 70, 91, 157; 464/37; 192/46, 56.1

[56] References Cited

U.S. PATENT DOCUMENTS

| | | | |
|---|---|---|---|
| 1,410,080 | 3/1922 | Schwahlen | 279/69 |
| 1,488,001 | 3/1924 | Clare | 279/69 |
| 2,346,706 | 4/1944 | Stoner . | |
| 2,563,112 | 8/1951 | Hill et al. | 464/37 |
| 2,784,976 | 3/1957 | Ondeck | 279/48 |
| 3,035,845 | 5/1962 | Benjamin | 279/51 |
| 3,544,121 | 12/1970 | Mizoguchi . | |
| 3,589,486 | 6/1971 | Kelch . | |
| 3,811,361 | 5/1974 | Seely et al. | 279/52 |
| 3,894,743 | 7/1975 | Hiroumi | 279/48 |
| 4,692,073 | 9/1987 | Martindell . | |
| 4,708,548 | 11/1987 | Taylor et al. | 279/140 |
| 4,721,423 | 1/1988 | Kubo . | |
| 4,799,838 | 1/1989 | Kubo et al. . | |
| 5,431,420 | 7/1995 | Huff et al. | 279/157 |
| 5,511,801 | 4/1996 | Kanaan et al. . | |
| 5,567,100 | 10/1996 | Nakamura . | |
| 5,577,872 | 11/1996 | Nakamura . | |

FOREIGN PATENT DOCUMENTS 57-184610  11/1982  Japan ........................ 279/48

Primary Examiner—Steven C. Bishop
Attorney, Agent, or Firm—Dority & Manning

[57] ABSTRACT

A quick release chuck device includes a body member and a device for attaching the body member to a drive spindle. A chamber in the body member receives a conventional collet. Thread grooves are defined on the outer circumferential surface of the body member. An operating sleeve is rotatably mounted on the body member and includes thread grooves defined on the inner circumferential surface. Rolling bodies are received in the thread grooves of the body member and sleeve member wherein the sleeve member is axially movable relative to the body member upon rotation of the sleeve member through engagement of the rolling bodies in the thread grooves. The sleeve member imparts a force to the collet in the chamber causing the collet to grip upon a tool shank carried therein.

13 Claims, 4 Drawing Sheets

COLLET CHUCK DEVICE

BACKGROUND OF THE INVENTION

The present invention relates to a chuck device for holding tool bits to a drive shaft of the power tool, and more particularly to a quick release chuck device incorporating a collet which is particularly useful in high speed applications, such as with routers.

A typical conventional system used on portable stationary routers, laminate trimmers, or dry wall cutters utilizes a collet tool holding device having a tapered collet that conforms to the hollow cone of the collet chuck or router motor shaft. Typically, a threaded nut is provided having a conical cam surface which matches the conical surface of the outer collet face. During operation of this type of device, the drive spindle or chuck of the machine tool must be held stationary in order to tighten the collet nut sufficiently. For this reason, most router chucks, for example, have spindle locks or are provided with an extra wrench that fits the chuck body or shaft. Similarly, to release the tool, the machine shaft or chuck body must be held stationary while the nut is loosened in the counterclockwise direction. This known conventional system has a number of drawbacks, for example, the tightening and loosening procedure has proven to be cumbersome and requires a separate device, such as a wrench for locking the spindle shaft. The degree of tightening of the collet device is limited by the frictional interface between the collet nut and chuck body.

Various attempts have been made in the art to provide an improved chuck device for high speed machine tools, particularly routers and the like. U.S. Pat. No. 5,511,801 issued to Kanaan et al., for example, provides a significant improvement in the art. The '801 patent discloses an integrated collet and chuck device which is actuated by turning a sleeve relative to a body member, with the sleeve having a nut fixed therein. The nut engages a screw member which is rotatably concentric within the nut. Rotation of the nut drives the screw member in the longitudinal direction and the screw member engages a collet thereby causing the collet to grip on a tool shank.

U.S. patent application Ser. No. 08/764,160 issued to Kanaan et al. and allowed on Jun. 23, 1997, discloses another quick release chuck device which is particularly useful on high speed tools. This device is actuated by a spring biased sleeve member which is moveable relative to a body member. Tapered pins are seated within tapered slots defined in the body member and contact and grip a tool shank inserted into the device in a spring biased position of the sleeve member.

U.S. Pat. No. 4,692,073 to Martindell describes a chuck apparatus for power bits utilizing a spring biased sleeve disposed about the drive spindle for axially securing the power bit to the chuck apparatus.

The present invention provides an improvement to the state of the art of quick release chuck devices utilizing a collet.

OBJECTS AND SUMMARY OF THE INVENTION

Therefore, a principal object of the present invention is to provide a quick release chuck device incorporating a collet for securing a tool bit or working device to a drive spindle of a machine tool.

A further object of the invention is to provide a integrated collet and chuck device which does not require a direct threaded or rotational screw member or nut interacting with a threaded body member for actuating the collet.

And yet a further object of the present invention is to provide a collet and chuck device wherein frictional resistance of the operating members is substantially eliminated.

Still another object of the present invention is to provide an improved chuck device for machine tools, particularly high speed machine tools such as routers, laminate trimmers, dry wall cutters, and the like.

Additional objects and advantages to the invention will be set forth in part in the description which follows and in part will be obvious from the description, or may be learned through practice of the invention. The objects and advantages of the invention may be realized and obtained by means of the instrumentalities and combinations particularly pointed out in the appended claims.

To achieve the objects and in accordance with the purposes of the invention, a chuck device is provided having a body member with a frustoconical chamber defined therein for receipt of a conventional collet. An operating sleeve member is rotatably mounted on the body member and comprises thread grooves defined in the inner circumferential surface thereof. Matching thread grooves are defined on an outer surface of the body member. Rolling bodies are received in the sleeve member and body member thread grooves. The sleeve member is movable axially relative to the body member upon rotation of the sleeve member in a tightening or loosening direction by means of engagement of the rolling bodies in the thread grooves. The sleeve member is in physical communication with the collet, for example, through a thrust bearing and thrust plate, for imparting a force to the collet. When the sleeve member is rotated in a tightening direction, it moves axially and forces the collet further into the frustoconical chamber, thereby causing the collet device to grip onto a tool shank carried within the collet.

In a preferred embodiment, a rotational locking device is provided to releasably lock the sleeve member in its tightened rotated position relative to the body member. In one preferred embodiment, the rotational locking device comprises a click ring rotationally fixed on the body member. The click ring has resilient arms with protrusions extending therefrom. The protrusions releasably engage in depressions defined on the inner circumferential surface of the sleeve member. As the sleeve member is rotated relative to the body member, the protrusions release from the depressions and cause an audible click. The feel of the release of the protrusions and the click noise provides the operator with an indication of the degree of tightness of the sleeve member.

An extraction member, such as a plate, is configured with the sleeve member and engaged with the collet device. The extraction member pulls the collet device out of the frustoconical chamber as the sleeve member is rotated in a loosening direction, thereby allowing for removal of a tool shank carried in the collet.

Means are also provided for mounting the body member onto the drive spindle of a machine tool, such as a router. Any conventional mounting means can be utilized in this regard.

It is preferred to utilize a thrust bearing between a front face of the operating sleeve member and the thrust plate in contact with the collet. With the thrust bearing, there is very little frictional resistance between the operating sleeve member and the thrust plate during tightening of the sleeve member. Thus, a small operating force, such as a hand movement, can be made more efficiently and effectively to actuate the chuck device.

In one preferred embodiment, the rolling bodies comprise balls housed in a ball cage. The spacing of the balls in the cage is arranged at a mutual distance with adjacent balls in a direction of the thread pitch and have their positions spaced along the direction of the thread pitch. It is possible to have the thread pitch of the thread grooves smaller than the diameter of the balls with the lead angle of the thread grooves being relatively small. As a result, a greater multiplication of the operating force may be obtained and transmitted to the collet, thereby producing an extremely effective clamping force.

The present chuck device is useful in any environment wherein it is desired to hold a tool to a driving member. The present chuck device is particularly well suited for high speed and high accuracy applications, such as with routers, laminate trimmers, drywall cutters, etc.

Additionally, the present device can incorporate any conventional collet, such as the well known split-steel type of collet and the equally well known collet having individual gripping members disposed in a resilient material.

The accompanying drawings, which are incorporated in and constitute a part of this specification, illustrate embodiments of the invention and, together with the description, serve to explain the principles of the invention.

DESCRIPTION OF THE PREFERRED EMBODIMENTS

Figure 1:
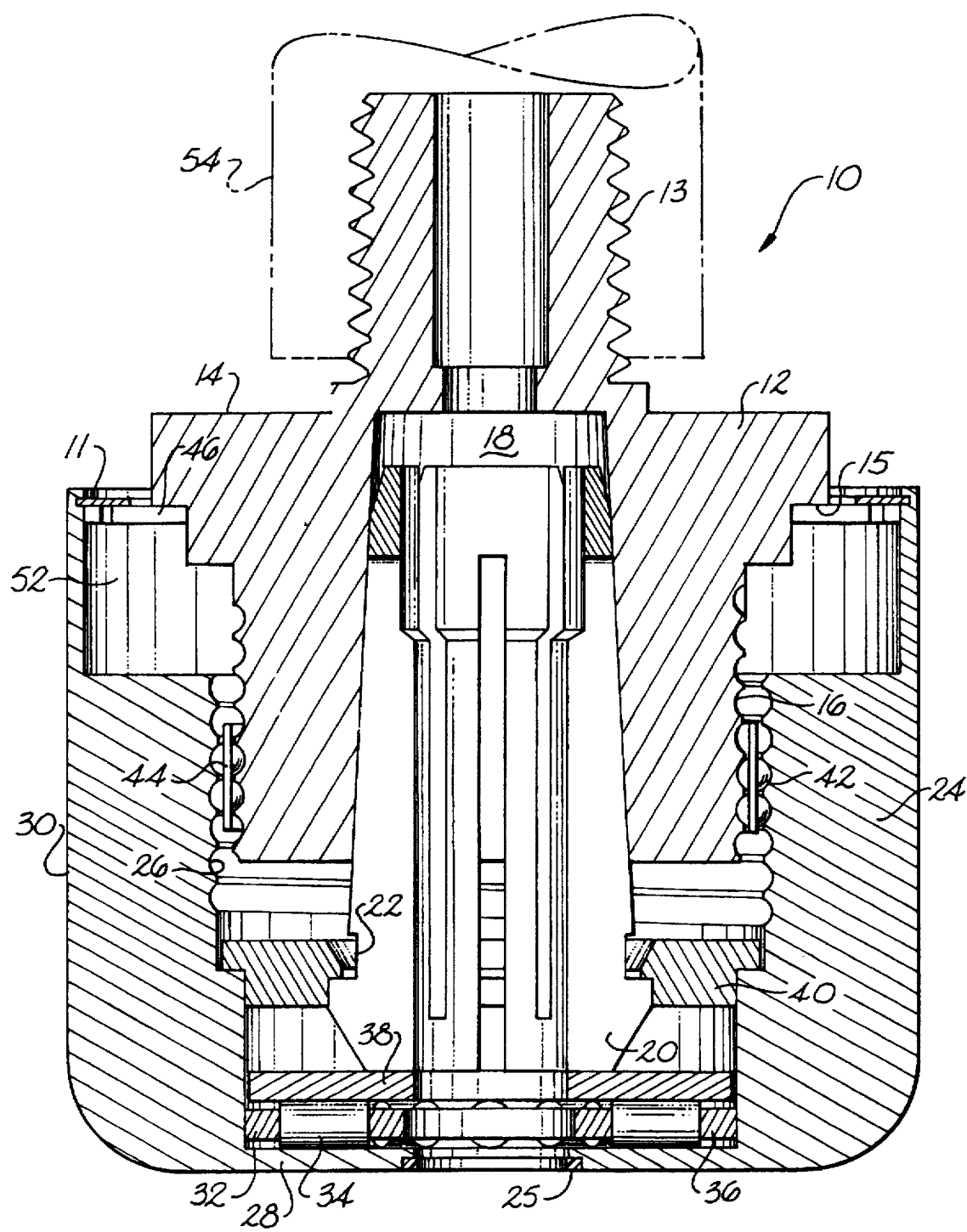
FIG. 1 is a cutaway perspective view of the chuck device according to the invention.
Figure 2:
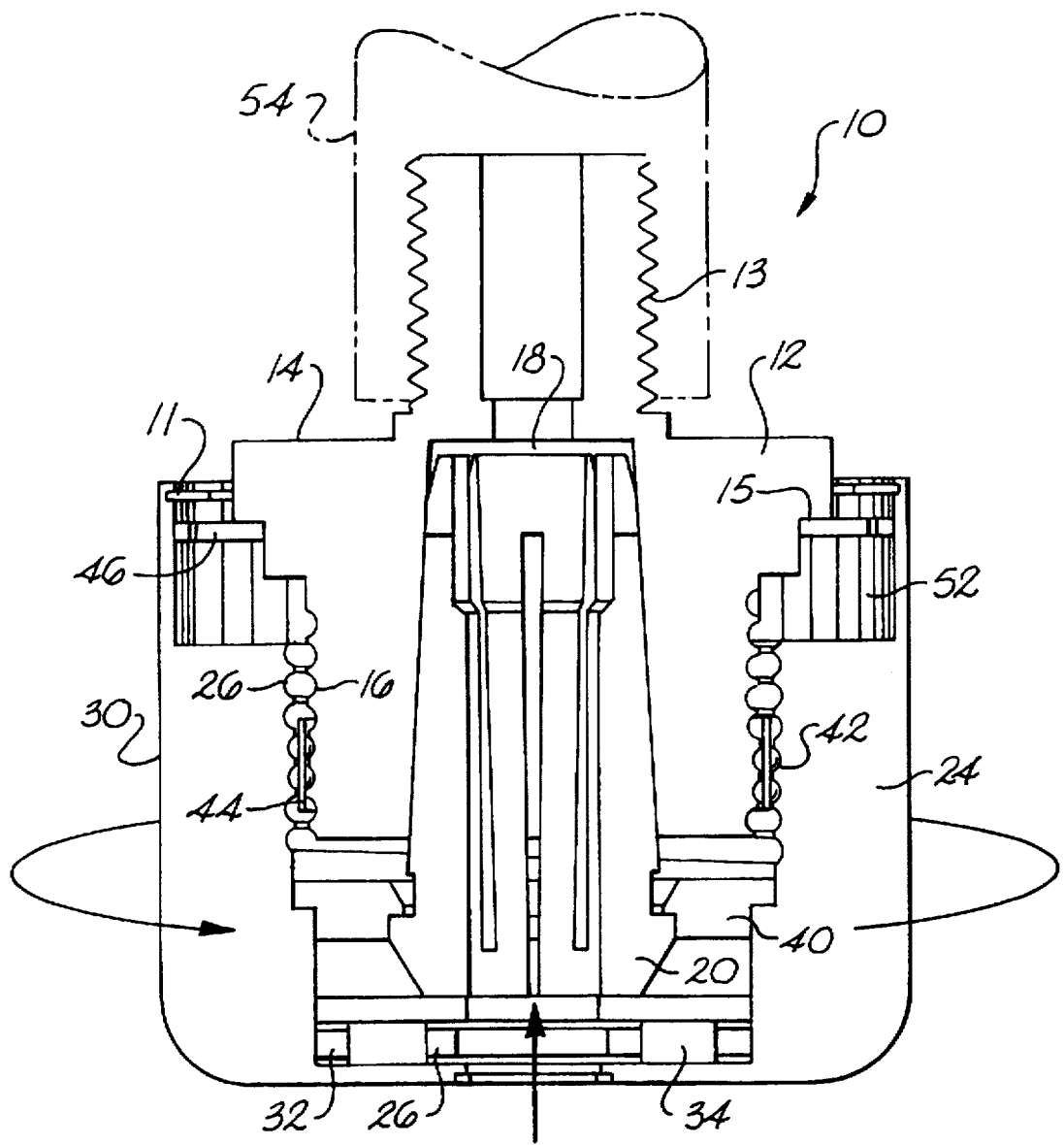
FIG. 2 is a cutaway operational view of the device illustrated in FIG. 1.

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations that come within the scope of the appended claims and their equivalents. The numbering of components in the drawings is consistent throughout the application, with the same components having the same number in each of the drawings.

Figure 4:
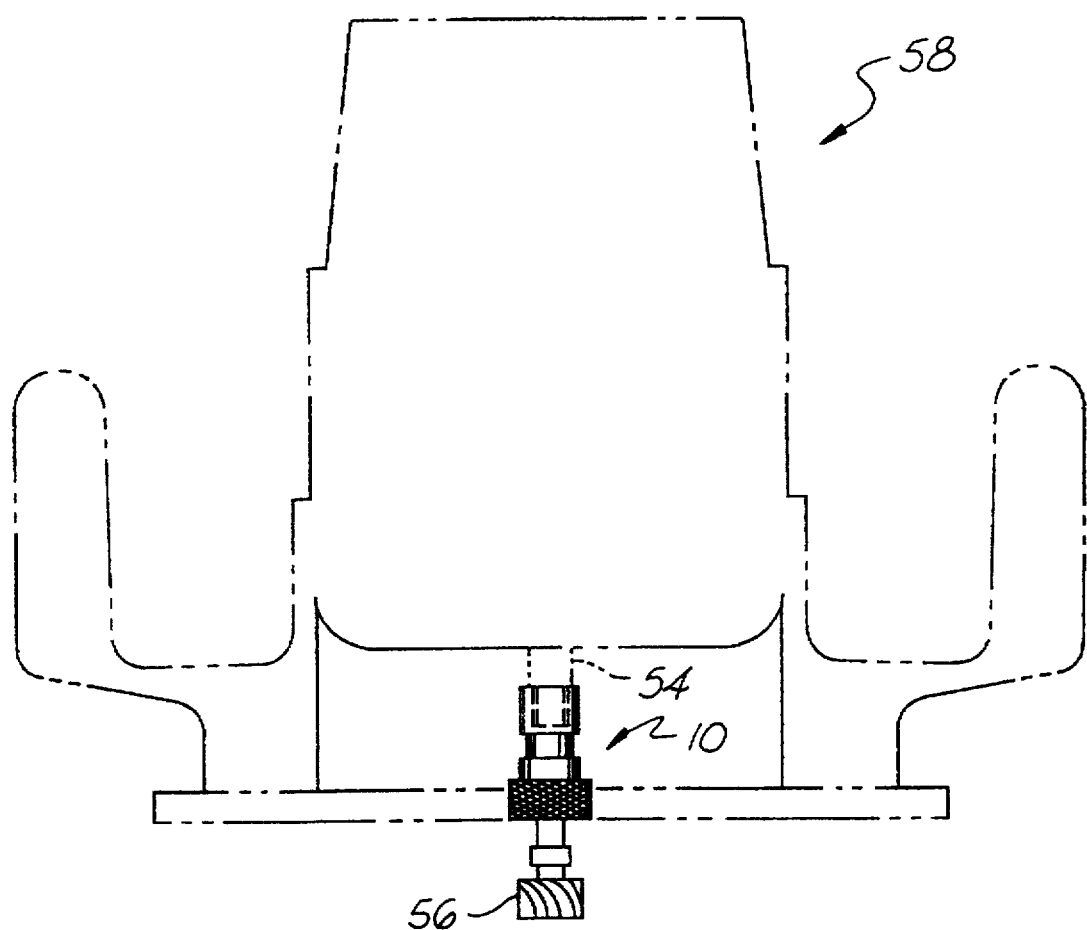
FIG. 4 is an environmental view of one application of the present chuck device.

The present chuck device is generally identified as 10 in the drawings. FIG. 4 illustrates one environment in which chuck device 10 is fixed to a drive spindle 54 of a conventional router 58. Device 10 is used to hold tool bit 56 to the drive spindle 54. The present chuck device 10 is particularly well suited for high speed applications, such as with routers, laminate trimmers, drywall cutters, etc. However, this is in no way meant as a limitation of the invention. Chuck device 10 can be utilized in any application wherein it is desired to hold a tool bit to a drive spindle of a machine tool.

Figure 3:
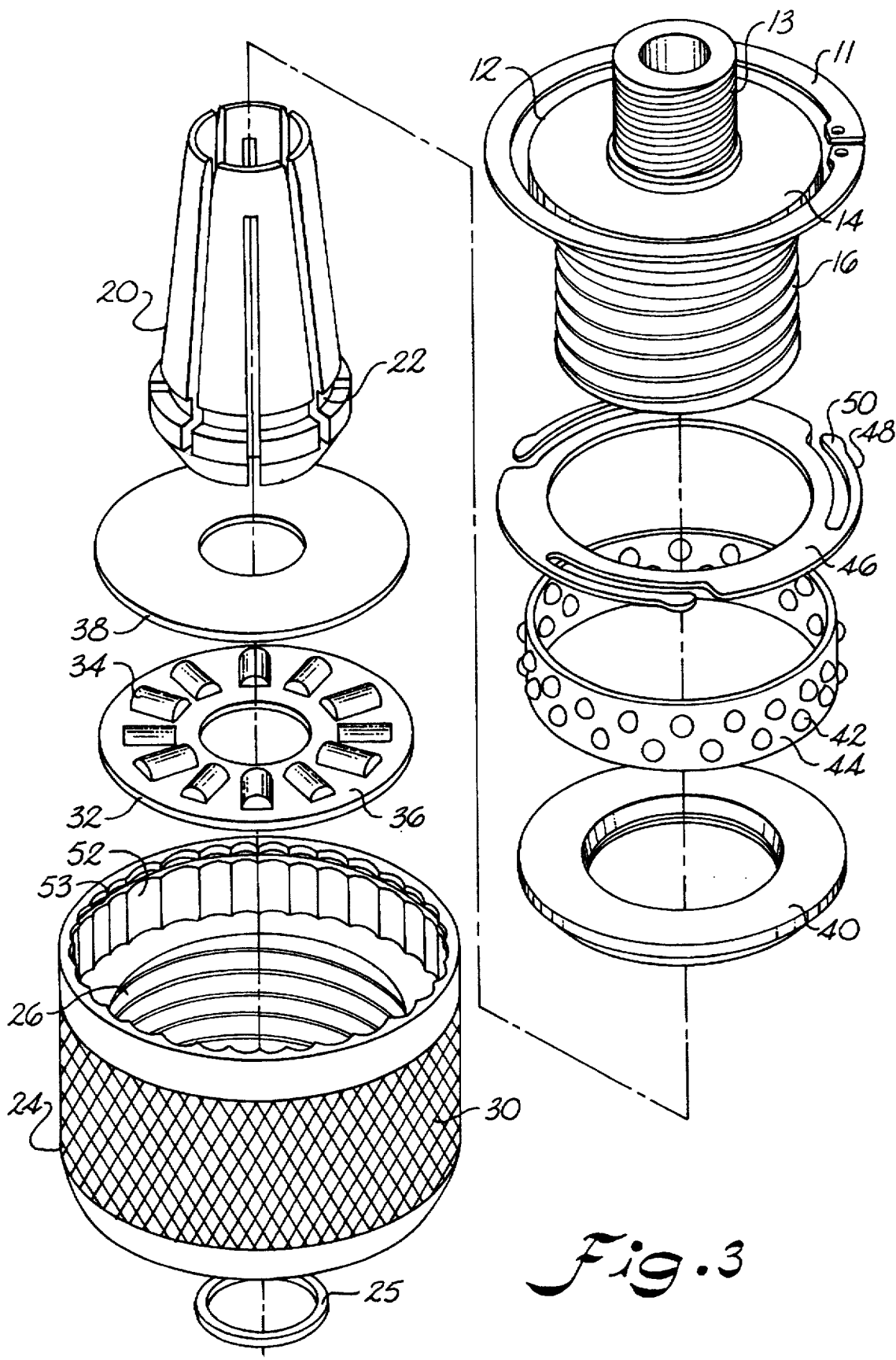
FIG. 3 is an in-line component view of the present chuck device.

Referring to FIGS. 1 and 3, in particular, chuck device 10 includes a body member 12. Body member 12 is configured for mounting to drive spindle 54. In the embodiment illustrated, the mounting means includes a relatively simple threaded stem section 13. Stem section 13 threadedly engages with a receiving threaded portion in the drive spindle. However, it should be understood that the threaded engagement illustrated in the figures is but one example of a suitable mounting means. Any conventional mounting means can be utilized to mount body member 12 to the drive spindle. For example, a ball-and-detent device, set screws, mechanical interlocks, or any other mounting system can be utilized in this regard. All such systems are within the scope and spirit of the invention.

Body member 12 includes a frustoconical chamber 18 defined therein. Chamber 18 houses a conventional collet 20. Collet 20 can comprise any conventional collet. For example, the typical split-steel collet may be utilized, as illustrated in the figures. In an alternate embodiment, collet 20 may comprise a plurality of individual longitudinal gripping jaws held in a spaced apart relation by resilient material disposed between the gripping jaws. Both of these types of conventional collets are well known to those skilled in the art. Also, the operation and the principles of such collets are well known by those in the art and a detailed description thereof is not necessary for purposes of this disclosure.

Body member 12 has an outer circumferential surface having thread grooves 16 defined thereon.

Body member 12 also includes a flange section or member 14. Flange 14 may be integrally formed as part of body member 12, or may comprise a separate component fixed on the body member. Flange member 14 defines a ridge 15.

An operating sleeve member 24 is rotatably mounted on body member 12. Sleeve member 24 generally surrounds body member 12 and includes thread grooves 26 defined on the inner circumferential surface thereof. A ring of adjacent depressions 52 are also defined on the inner circumference of the sleeve member generally near the end thereof. The purpose of the depressions 52 will be discussed below.

Sleeve member 24 also includes a front face 28. Front face 28 is essentially opposite of the front face of collet device 20.

Means are disposed between sleeve member 24 and body member 12 for reducing rotational friction therebetween. In the embodiment illustrated, this means includes rolling bodies or balls 42 carried in the opposite facing thread grooves 16 and 26. Balls 42 may be carried in a ball cage or ring 44. The plurality of balls 42 are arranged at intervals and distance from each other in the cage 44 in the direction of the thread pitch of thread grooves 26 and 16 to prevent clustering of the balls in the direction of the thread pitch. With this arrangement, the width of the thread pitch can be formed smaller than the diameter of balls 42. The lead angle of the thread grooves 26 and 16 is relatively small, and preferably at an angle of around two degrees, resulting in a great multiplication of the operating force obtained through rotation of sleeve member 24 and transmitted to collet 20.

Rotation of sleeve 24 in a tightening direction causes balls 42 and retaining ring or cage 44 to move around thread grooves 26, 16 resulting in sleeve member 24 being screw fed in the axial direction. When sleeve member 24 is screw fed towards body member 12, front face 28 of the sleeve member forces collet 20 further into chamber 18, causing the collet to grip a tool shank carried therein, as is well understood. In this regard, chuck device 10 preferably includes a thrust plate 38 disposed adjacent collet 20 and a thrust bearing 32 disposed between front face 28 and thrust plate 38. In the embodiment illustrated, thrust bearing 32 includes a plurality of roller bearings 34 carried in a plate 36. Thrust bearing 32 virtually eliminates the rotational friction between sleeve member 24 and collet 20 or thrust plate 38. Very little manual effort is required to rotate sleeve member 24 in the tightening direction.

Chuck device 10 also includes a releasable rotational lock for sleeve member 24. Once sleeve member 24 is rotated in the tightening direction to clamp a tool bit, it must be maintained in the desired rotational position to ensure continued actuation of collet 20. In the embodiment illustrated, the rotational lock device includes a ring 46 press fitted or otherwise non-rotatably fixed to body member 12 adjacent ridge 15. Ring 46 includes a plurality of resilient arm members 48 having protuberances 50 defined on the ends thereof. Protuberances 50 releasably engage in depressions 52 defined in sleeve member 24. Arms 48 have an elasticity and thus cause protuberances 50 to be spring biased into recesses 52. When sleeve member 24 is rotated relative to body member 12, protuberances 50 release from one recess 52 and spring into the adjacent recess 52. This action generates an adjustment noise or audible click from the engagement and release of protuberances 50. There is enough elasticity in arms 48 so that protuberances 50 engaging in recesses 52 rotationally lock sleeve member 24 relative to body member 12 yet allow for relatively easy manual rotation or adjustment of ring 24 in either direction. The audible click or noise, as well as the physical feel of the release of the protuberances, caused by this device acts as an indicator to the operator confirming the clamping state of the chuck.

It should be understood that any number of conventional locking devices or systems could be utilized in the present invention to rotationally lock sleeve member 24 relative to body member 12. For example, a ball-and-detent device could be utilized, or similar structure. All such devices or systems are within the scope and spirit of the invention.

A clip ring or retaining ring 11 is seated in a groove 53 defined in sleeve member 24. Retaining ring 11 prevents sleeve 24 from being rotated off of body member 12.

An extraction device is provided so that collet 20 can be pulled axially forward out of chamber 18 in order to remove a tool bit carried by the collet. In the embodiment illustrated, this extraction device includes an extraction plate 40 press fitted into sleeve 24. Plate 40 engages in an annular groove 22 defined in collet 20. In this manner, as sleeve 24 is rotated in the loosening direction and moves axially forward away from body member 12, plate 40 engaged in annular groove 22 causes collet 22 to be pulled axially forward to release a tool shank carried therein.

The chuck device 10 according to the invention can be utilized in any manner or environment where it is necessary to grip or hold the shank of a tool to a drive spindle. The device is particularly applicable in the router chuck field. However, the invention is not limited to this field. In fact, it should be apparent to those skilled in the art that various modifications and variations can be made in the apparatus of the present invention without departing from the scope or spirit of the invention. For example, the configuration of the sleeve or body member can take on any number of embodiments. Thus, it is intended that the present invention cover such modifications and variations of the invention as come within the scope and spirit of the appended claims and their equivalents.

What is claimed is:

1. A chuck device, comprising:

a body member;

a frustoconical chamber defined within said body member, and a collet device operably housed in said frustoconical chamber;

thread grooves defined on an outer circumferential surface of said body member;

an operating sleeve member rotatably mounted on said body member, said operating sleeve member comprising thread grooves defined on an inner circumferential surface of said sleeve member;

rolling bodies received and freely rotatable in said sleeve member thread grooves and said body member thread grooves, said sleeve member axially movable relative to said body member upon rotation of said sleeve member through engagement of said rolling bodies in said thread grooves, said sleeve member in communication with said collet device for imparting a force thereto;

a rotational locking device configured operationally outside of said rolling bodies and said grooves to directly and releasably lock said sleeve member to said body member; and wherein rotation of said sleeve member in a tightening direction causes movement of said sleeve member towards said body member forcing said collet device further into said frustoconical chamber causing said collet device to grip a tool shank carried therein.

2. The device as in claim 1, wherein said rotational locking device comprises a ring member rotationally fixed to said body member and having resilient arms engaging in depressions defined in said inner circumferential surface of said sleeve member.

3. The device as in claim 2, wherein said resilient arms are flexible and release from said depressions upon rotation of said sleeve member and emit an audible click, and said depressions extend longitudinally within said sleeve member thereby allowing said sleeve member to move longitudinally relative to said body member.

4. The device as in claim 1, further comprising an extraction member configured with said sleeve member and engaged with said collet device, said extraction member pulling said collet device out of said frustoconical chamber as said sleeve member is rotated in a loosening direction.

5. The device as in claim 1, further comprising a thrust plate disposed between said collet device and a front thrust flange of said sleeve member, said sleeve member imparting said force to said collet device through said thrust flange and said thrust plate.

6. The device as in claim 5 further comprising a thrust bearing disposed between said thrust flange and said thrust plate to decrease rotational friction therebetween.

7. The device as in claim 1, further comprising means for mounting said body member to a drive spindle of a driving tool.

8. The device as in claim 1, wherein said device is a router chuck device.

9. A chuck device, comprising:

a body member, and means for mounting said body member to a drive spindle of a driving tool;

a collet device operably housed in said body member;

an actuating sleeve member in communication with said collet device and rotatably mounted on said body member, said sleeve member being manually rotatable on said body member and axially movable relative to said body member upon rotation of said sleeve member, wherein axial movement of said sleeve member actuates said collet device;

means disposed between said sleeve member and said body member for reducing rotational friction therebetween; and a rotational locking mechanism operably disposed directly between said sleeve member and said body member and operationally independent of said means for reducing rotational friction for locking said sleeve member relative to said body member.

10. The device as in claim 9, wherein said means for reducing fiction comprises rolling bodies seated in thread grooves defined in said body member and said sleeve member. bodies comprise balls carried in a ball cage.

11. The device as in claim 10, wherein said rolling bodies comprise balls carried in a ball cage.

12. The device as in claim 9, wherein said rotational locking mechanism comprise a ring member rotationally fixed on said body member having protuberances extending therefrom which releasably engage in longitudinal recesses defined in said sleeve member.

13. The device as in claim 9, further comprising a thrust bearing disposed between a front face of said sleeve member and said collet device.

* * * * *